US012683544B2

(12) United States Patent
Lopez

(10) Patent No.: US 12,683,544 B2
(45) Date of Patent: Jul. 14, 2026

(54) SOLAR PANEL HAVING ZIGZAG-ORIENTED SOLAR MODULES

(71) Applicant: Pablo Manuel Lopez, Celebration, FL (US)

(72) Inventor: Pablo Manuel Lopez, Celebration, FL (US)

(*) Notice: Subject to any disclaimer, the term of this patent is extended or adjusted under 35 U.S.C. 154(b) by 0 days.

(21) Appl. No.: 19/216,407

(22) Filed: May 22, 2025

(65) Prior Publication Data

US 2025/0364946 A1 Nov. 27, 2025

Related U.S. Application Data

(60) Provisional application No. 63/650,694, filed on May 22, 2024.

(51) Int. Cl.
H02S 30/20 (2014.01)
H02S 20/32 (2014.01)

(52) U.S. Cl.
CPC .............. H02S 30/20 (2014.12); H02S 20/32 (2014.12)

(58) Field of Classification Search
CPC ................................. H02S 30/20; H02S 20/32
See application file for complete search history.

(56) References Cited

U.S. PATENT DOCUMENTS

| | | | |
|---|---|---|---|
| 8,382,513 | B2 | 2/2013 | Kobayashi |
| 8,697,983 | B2 | 4/2014 | Cashion et al. |
| 9,099,590 | B2 | 8/2015 | Taira et al. |

| | | | |
|---|---|---|---|
| 9,729,101 | B1 | 8/2017 | Schmelzle et al. |
| 10,074,755 | B2 | 9/2018 | Yang et al. |
| 10,128,391 | B2 | 11/2018 | Corneille et al. |
| 10,224,869 | B1 | 3/2019 | Hammers et al. |
| 11,437,536 | B2 | 9/2022 | Vatelmacher |
| 11,888,442 | B2 | 1/2024 | Vatelmacher |
| 11,901,857 | B2 | 2/2024 | Michotte De Welle et al. |
| 11,914,404 | B2 | 2/2024 | Ma et al. |
| 2014/0182652 | A1 | 7/2014 | Song et al. |
| 2014/0209146 | A1 | 7/2014 | Park et al. |
| 2015/0331972 | A1* | 11/2015 | McClure .................. G06F 17/11 703/2 |
| 2016/0322932 | A1 | 11/2016 | Lee |
| 2019/0252564 | A1 | 8/2019 | Farshchi et al. |
| 2020/0212235 | A1 | 7/2020 | Hussain et al. |

(Continued)

OTHER PUBLICATIONS

Yilbas, B. S., Al-Sharafi, A., Ali, H., Al-Aqeeli, N., Al-Qahtani, H., Al-Sulaiman, F., Abu-Dheir, N., Abdelmagid, G., & Elkhazraji, A. (2018). Environmental dust removal from inclined hydrophobic glass surface: avalanche influence on dynamics of dust particles. RSC Advances, 8(59), 33775-33785. https://doi.org/10.1039/c8ra07503d.

*Primary Examiner* — Jayne L Mershon
(74) *Attorney, Agent, or Firm* — Dunlap Bennett & Ludwig PLLC

(57) ABSTRACT

A solar panel with zigzag-oriented solar module pairs for maximizing solar power generation is disclosed. Each solar module has two solar modules oriented relative to each other so that their respective photovoltaic sides define an approximately twenty-degree angle. Each solar panel may have a series of photovoltaic sides where each adjacent photovoltaic sides are interconnected by an intermediate portion that is flexible to move from a flat condition to a folded condition that defines the zigzag-oriented solar module pairs.

13 Claims, 16 Drawing Sheets

(56)                    References Cited

U.S. PATENT DOCUMENTS

| | | | |
|---|---|---|---|
| 2021/0203274 A1* | 7/2021 | Jun | ........................ H10F 77/00 |
| 2022/0190773 A1 | 6/2022 | Selten et al. | |
| 2023/0307574 A1 | 9/2023 | Vatelmacher | |

* cited by examiner

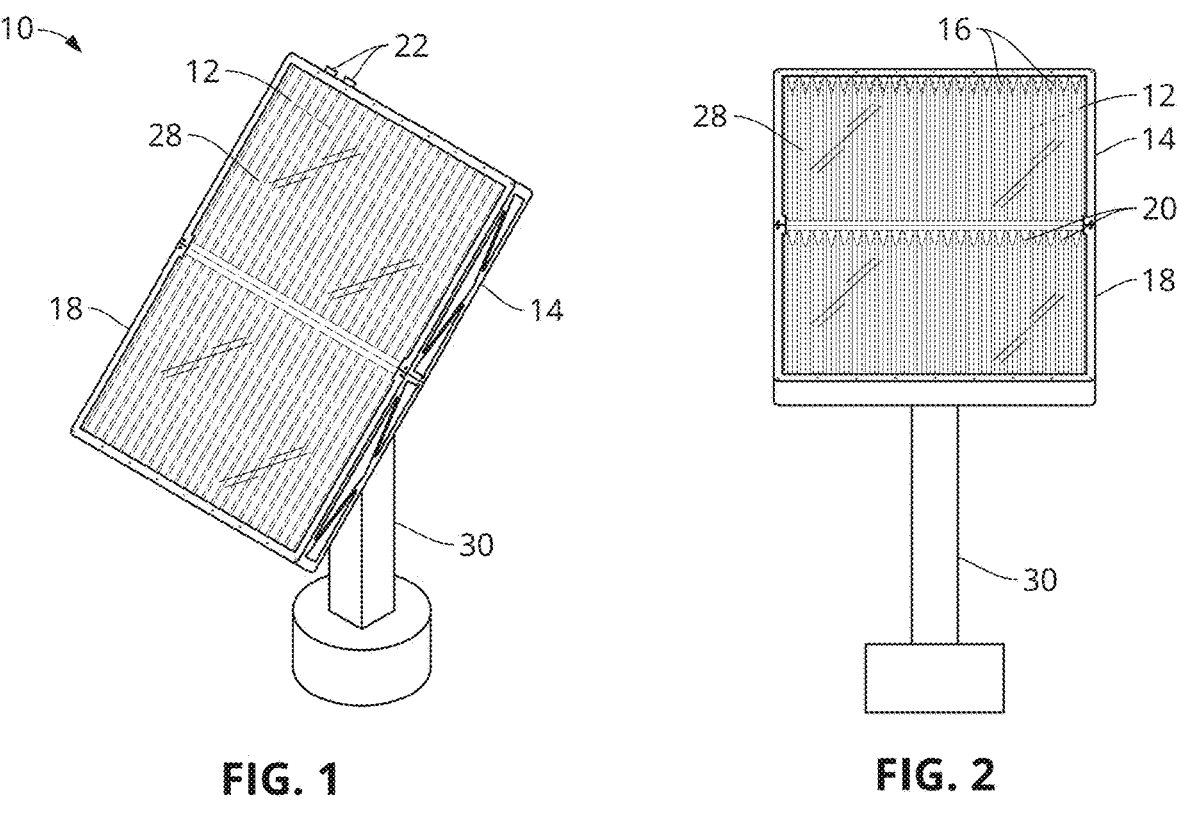
FIG. 1
FIG. 2
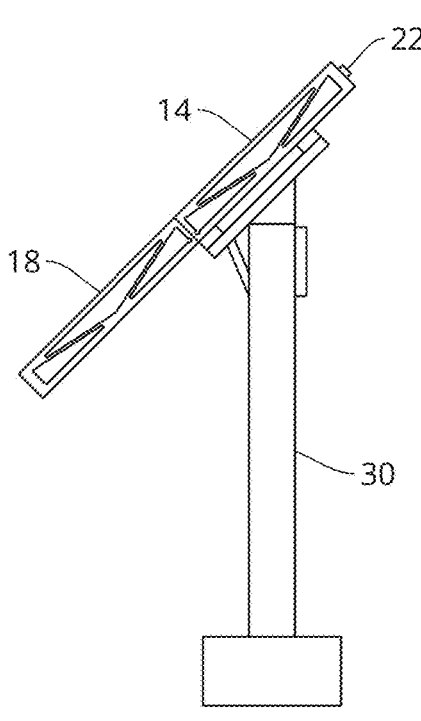
FIG. 3

Test Data: Angle Testing, Find Optimal Angle

| Time/Name | Angle (from horiz) | Voltage (V) Left | Voltage (V) Right | Current (A) Left | Current (A) Right | Power (W) Left | Power (W) Right | Horiz Dist | Ratio (W/dist) Left | Ratio (W/dist) Right | Ratio (W/dist) Avg | Est. Total Power (assuming left panel only) | Est. Total Power (assuming both panels) |
|---|---|---|---|---|---|---|---|---|---|---|---|---|---|
| 1:00PM | 90.00 | 3.11 | 2.97 | 0.81 | 0.22 | 2.5291 | 0.6534 | 0.17364818 | 14.51 | 3.76 | 9.13 | 120.92 | 76.14 |
| 1:00PM | 80.00 | 3.14 | 3.04 | 0.88 | 0.32 | 2.7632 | 0.9728 | 0.17364818 | 15.91 | 5.60 | 10.76 | 132.63 | 89.66 |
| 1:35PM | 80.00 | 3.23 | 3.21 | 1.2 | 0.7 | 3.876 | 2.247 | 0.34202014 | 11.33 | 6.57 | 8.95 | 94.46 | 74.61 |
| 12:40PM | 70.00 | 3.32 | 3.32 | 0.96 | 0.75 | 3.1872 | 2.49 | 0.34202014 | 9.32 | 7.28 | 8.30 | 77.67 | 68.18 |
| 1:00PM | 60.00 | 3.24 | 3.24 | 1.6 | 0.96 | 5.184 | 3.1104 | 0.5 | 10.37 | 6.22 | 8.29 | 86.42 | 59.13 |
| 12:40PM | 60.00 | 3.25 | 3.27 | 1.37 | 0.74 | 4.4525 | 2.4198 | 0.5 | 8.91 | 4.84 | 6.87 | 74.22 | 57.28 |
| 1:30PM | 50.00 | 3.27 | 3.27 | 1.99 | 1.23 | 6.5073 | 4.0221 | 0.64278761 | 10.12 | 6.26 | 8.19 | 84.38 | 68.27 |
| 12:40PM | 50.00 | 3.22 | 3.23 | 1.51 | 0.84 | 4.8622 | 2.7132 | 0.64278761 | 7.56 | 4.22 | 5.89 | 63.05 | 49.12 |
| Regular | 40.00 | 3.30 | 3.32 | 2.15 | 1.12 | 7.095 | 3.7184 | 0.766044443 | 9.26 | 4.85 | 7.06 | 77.20 | 58.83 |
| Regular | 30.00 | 3.27 | 3.27 | 2.44 | 1.52 | 7.9788 | 4.9704 | 0.86602754 | 9.21 | 5.74 | 7.48 | 76.79 | 62.32 |
| Regular | 20.00 | | | | | | | | | | | | |
| Regular | 10.00 | | | | | | | | | | | | |
| Max | 0.00 | 3.31 | 2.67 | 3.31 | 2 | 10.9561 | 5.34 | 1 | 10.96 | 5.34 | 8.15 | 91.32 | 62.91 |

| Est. percent increase in Efficiency | Optimal Angle source to degrees |
|---|---|
| 32.03% | |

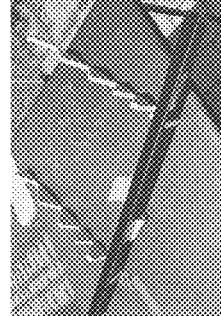

Results

* 32.03% INCREASE in power output per unit of horizontal area
* Optimal Angle approximately 80 degrees (WRT Horizontal)

FIG. 13

Test Data: Angle Testing, Verify Optimal Angle

Environment Conditions
- Partly Cloudy/Clear (Optimal)
- 90F
- Solar noon (Optimal): 12:40-2pm

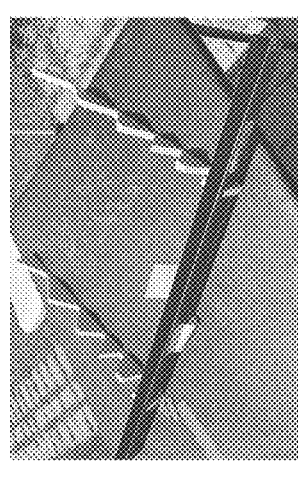
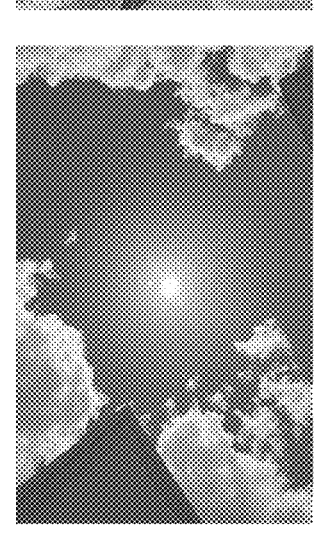

| Time/Name | Angle (from horiz) | Voltage (V) Left (..40) | Voltage (V) Right (..37) | Current (A) Left | Current (A) Right | Power (W) Left | Power (W) Right | Horiz Dist | Ratio (W/dist) Left | Ratio (W/dist) Right | Ratio (W/dist) Avg | Est. Total Power (assuming left panel only) | Est. Total Power (assuming both panels) |
|---|---|---|---|---|---|---|---|---|---|---|---|---|---|
| 2:16PM | 90.00 | 3.30 | 3.304 | 0.495 | 0.725 | 1.631025 | 2.398704 | 0.17364818 | 9.39 | 13.81 | 11.60 | 78.29 | 96.71 |
| 2:21PM | 80.00 | 3.16 | 3.087 | 0.579 | 0.591 | 1.831377 | 1.824417 | 0.17364818 | 10.55 | 10.51 | 10.53 | 97.91 | 87.74 |
| 2:45PM | 70.00 | 3.33 | 3.295 | 0.865 | 1.204 | 2.88045 | 3.96718 | 0.34262014 | 8.42 | 11.60 | 10.01 | 70.20 | 83.44 |
| 2:55PM | 60.00 | 3.25 | 3.2 | 0.664 | 0.59 | 2.158 | 1.888 | 0.17364818 | 12.43 | 10.87 | 11.65 | 103.58 | 97.10 |
| Ref @ 2:30PM | 0.00 | 3.21 | 3.206 | 2.89 | 2.55 | 9.2740 | 8.1753 | 1 | 9.27 | 8.18 | 8.72 | 77.38 | 72.73 |

Est. Percent Increase in Efficiency: 33.53%

PROOF OF CONCEPT

Results
- 33.53% INCREASE in power output per unit of horizontal area
- Successful Proof of Concept

FIG. 14

Test Data: Demo Prototype Testing

Environment Conditions
- Partly Cloudy/Clear (Optimal)
- 85–92F
- Solar noon (Optimal): 1:40pm Assumptions
- Lower efficiency than angle testing due to electrical contact resistances, defective cells, etc.

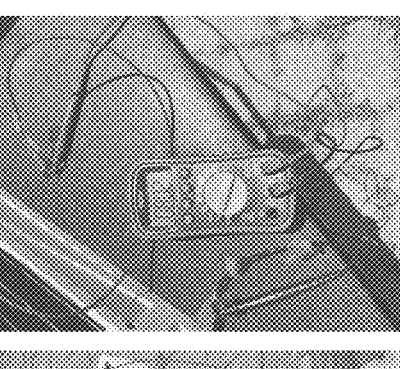
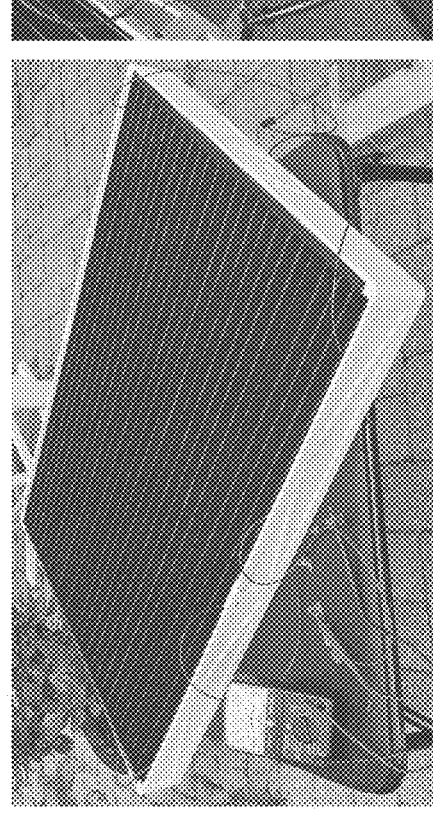

| Time/Name | Angle (from horiz) | Voltage (V) | Current (A) | Power (W) |
|---|---|---|---|---|
| 1:40PM | 80.00 | 82.08 | 1.04 | 85.43 |
| Flat @ 1:40PM | 0.00 | | | 67.91 |

| Est. Percent Increase in Efficiency | 22.82% | Proof of Concept |
|---|---|---|

Results
- 22.82% INCREASE in power output per unit of horizontal area
- Close enough to further justify proof of concept
- Production Prototype will have larger increase

FIG. 15

SOLAR PANEL HAVING ZIGZAG-ORIENTED SOLAR MODULES

CROSS REFERENCE TO RELATED APPLICATION

This application claims the benefit of priority of U.S. provisional application No. 63/650,694, filed May 22, 2024, the contents of which are herein incorporated by reference.

BACKGROUND OF THE SUBJECT DISCLOSURE

The present subject disclosure relates to solar array modules and, more particularly, to a solar panel unit with zigzag-oriented solar modules for maximizing solar power generation.

Utility solar power generation, unlike other energy sources, requires relatively large areas of land to be covered with solar panels to provide sufficient power to support an energy grid. In addition, utility solar power generation requires high upfront costs for site development. As a result of these preconditions, solar power can appear less desirable or profitable than other energy sources. This is problematic since solar power is one of the only energy sources that does not produce polluting emissions nor uses limited natural resources yet has the capacity to power portions of the world's energy needs.

Separately, some solar power technologies undergo significant degradation over time that result in a lower performance system. This is a disadvantage because lower performing systems might require frequent component replacements over time to keep performance at satisfactory levels in view of the demand curve.

Again, standard flat or flexible solar panels require large land area for sufficient power generation and have high upfront costs. This makes standard flat or flexible solar panels less desirable for many applications, especially utility energy. In addition, some solar panel technologies undergo significant degradation over time that result in a lower performance system.

In other words, standard flat or flexible solar panels produce a lower power output per unit of land area than other energy sources, and high upfront costs can take significant time to make a return on investment. This power output limit is a function of the solar panel dimensions and material properties. This limited power output, in turn, requires large areas of land to be covered with these solar panels to meet utility energy needs, while, as mentioned above, their material properties are subject to significant degradation over time.

As can be seen, there is a need for a solar panel unit with zigzag-oriented solar modules for maximizing solar power generation.

SUMMARY OF THE SUBJECT DISCLOSURE

One assembly of the subject disclosure provides a zigzag orientation (triangle waveform) of adjacent solar modules, whereby light that scatters off the photovoltaic side of a first module may be reflected onto the photovoltaic side of the adjacent module, thus harnessing more light that would otherwise be lost.

As a result, the zigzag orientation can generate significantly more power than a similarly sized standard flat or flexible solar panel, in terms of linear footprint defined by the peripheral dimensions of the solar panel frame. In addition, the subject disclosure has a simple design that will result in relatively low manufacturing costs for this high level of power output.

As a result, the subject disclosure enables a lower cost per unit of power produced than a standard flat or flexible solar panel. Furthermore, the design of the subject disclosure has about five times lower degradation over time that will result in more steady system performance over time.

This solar panel unit disclosed herein has significantly higher power output than traditional solar panels. This results in significantly less land usage being needed for utility solar power sites. In addition, the subject disclosure is easy to manufacture and so can be afforded with lower upfront costs than traditional solar panels.

The subject disclosure allows greater solar power generation than a standard flat or flexible solar panel due to the enclosed zigzag orientation of adjacent solar modules. The zigzag orientation allows more solar power generation within a specific footprint than a traditional horizontal orientation because the design enables more solar cell surface area that is exposed to the sun, delivering more power per unit of horizontal area more.

Furthermore, a solar tracking fixture holds and moves the enclosed solar modules to a position with optimal sunlight.

In one aspect of the present subject disclosure, a solar panel assembly includes one or more solar module pairs that define a zigzag orientation, wherein for each solar module pair, two adjacent solar modules define an included angle of approximately twenty degrees.

In another aspect of the present subject disclosure, the solar panel assembly further includes wherein, for each of the two adjacent solar modules, the solar module defines an angle of approximately ten degrees relative to a direction of a source of light in a used condition, wherein a footprint of the solar panel assembly defines a footprint-plane, and wherein the footprint-plane is normal to the direction of the source of light in the used condition; and further including a solar tracking fixture operatively associated with the solar panel assembly, wherein the solar tracking fixture is configured to maintain the footprint-plane normal to the direction of the source of light in the used condition; a frame that houses the one or more solar module pairs, wherein the frame provides a plurality of sidewalls; each sidewall of two opposing sidewalls of the plurality of sidewalls comprises a mounting bracket, wherein the mounting bracket defines a series of zigzag oriented flanges, where each two adjacent zigzag oriented flanges define an included angle of approximately twenty degrees, wherein the frame comprises a first housing frame and a second housing frame, both housing frames configured to form a removable connection, wherein each housing frame provides a plurality of sidewalls; each sidewall of two opposing sidewalls of the plurality of sidewalls comprises a mounting bracket, wherein the mounting bracket defines a series of zigzag oriented flanges, where each two adjacent zigzag oriented flanges define an included angle of approximately twenty degrees, wherein each mounting bracket of first housing frame is dimensioned and shaped to form a removably connection with each mounting backet of the second housing frame, whereby the removably connection is formed, and wherein each solar module of the one or more solar module pairs comprises a photovoltaic side, wherein each solar module pairs comprise two photovoltaic sides facing each other and defining the included angle, wherein each solar module pair is interconnected by an intermediate portion sufficiently flexible to the solar panel assembly from a flat condition to a folded condition providing the one or more solar module pairs zigzag oriented;

and at least one drainage slot in each intermediate portion, wherein each solar module pair comprises two elongated solar modules wherein a length of each solar module is at least ten times that of a width of the solar module.

In yet another aspect of the present subject disclosure, a method of making a solar panel assembly includes the following: folding a unitary solar panel to form one or more solar module pairs that define a zigzag orientation, wherein for each solar module pair, two adjacent solar modules define an included angle of approximately twenty degrees, wherein for each of the one or more solar module pairs, a flexible intermediate portion separates adjacent solar modules, wherein the flexible intermediate portion folds to define the zigzag orientation, and wherein each flexible intermediate portion comprises a plurality of drainage holes.

These and other features, aspects and advantages of the present subject disclosure will become better understood with reference to the following drawings, description and claims.

BRIEF DESCRIPTION OF THE DRAWINGS

FIG. 1 is a perspective view of an exemplary embodiment of the subject disclosure shown in a used condition operatively associated with a solar tracking fixture base 30.

FIG. 2 is a front elevation view of an exemplary embodiment of the subject disclosure shown in the used condition operatively associated with the solar tracking fixture base 30.

FIG. 3 is a side elevation view of an exemplary embodiment of the subject disclosure shown in the used condition operatively associated with the solar tracking fixture base 30.

FIG. 13 is a tabular view of an exemplary embodiment of the subject disclosure, showing test data used to determine an optimal included angle between two adjacent solar modules 12 or solar module pair.

FIG. 14 is a tabular view of an exemplary embodiment of the subject disclosure, showing test data used to determine an optimal included angle between two adjacent solar modules 12 or solar module pair.

FIG. 15 shows a plurality of views of an exemplary embodiment of the subject disclosure, illustrating test data used to determine an optimal included angle between several solar module pairs. Though the preferred included angle may be approximately twenty degrees (since the congruent optimal angles of eighty-degrees in addition to the included angle being three supplementary angles), the subject disclosure contemplates where the included angle may be between zero and ninety degrees and confer a beneficial percent increase in efficiency due to capturing reflected line in comparison to completely flat solar modules.

DETAILED DESCRIPTION OF THE SUBJECT DISCLOSURE

The following detailed description is of the best currently contemplated modes of carrying out exemplary embodiments of the subject disclosure. The description is not to be taken in a limiting sense but is made merely for the purpose of illustrating the general principles of the subject disclosure, since the scope of the subject disclosure is best defined by the appended claims.

Referring to FIGS. 1 through 21, the subject disclosure may include a solar panel assembly 10 adapted to transform sunlight into usable electricity. The solar panel assembly 10 provides one or more pairs of adjacent zigzag oriented solar modules 12, wherein a plurality of these solar module pairs 12 can be connected in a solar panel assembly 10 or a solar power system.

To be clear, the term "solar module" refers to a connected assembly of multiple solar cells wired together in series (or in some embodiments, parallel) to increase voltage. A solar cell (or photovoltaic cell) is the fundamental electricity-generating unit in solar technology. It's a semiconductor device that directly converts sunlight into electricity through the photovoltaic effect. Typically, a single solar cell is made from silicon (monocrystalline, polycrystalline) or thin-film semiconductors (CdTe, CIGS, amorphous silicon) to generate limited power (around 1-5 watts) depending on its size and efficiency. A single solar cell is relatively small, typically three to six inches by three to six inches, or up to 156×156 mm for standard silicon cells.

The solar panel assembly 10 mounts each pair of solar modules on a rigid housing frame. Each pair of solar modules are typically encapsulated with EVA (ethylene vinyl acetate), covered with tempered glass or transparent film on the front, and typically a polymer back sheet. The solar panel assembly 10 may include bypass diodes to minimize power loss and damage when a portion of cells are shaded as well as incorporate a junction box for electrical connections.

Figure 4:
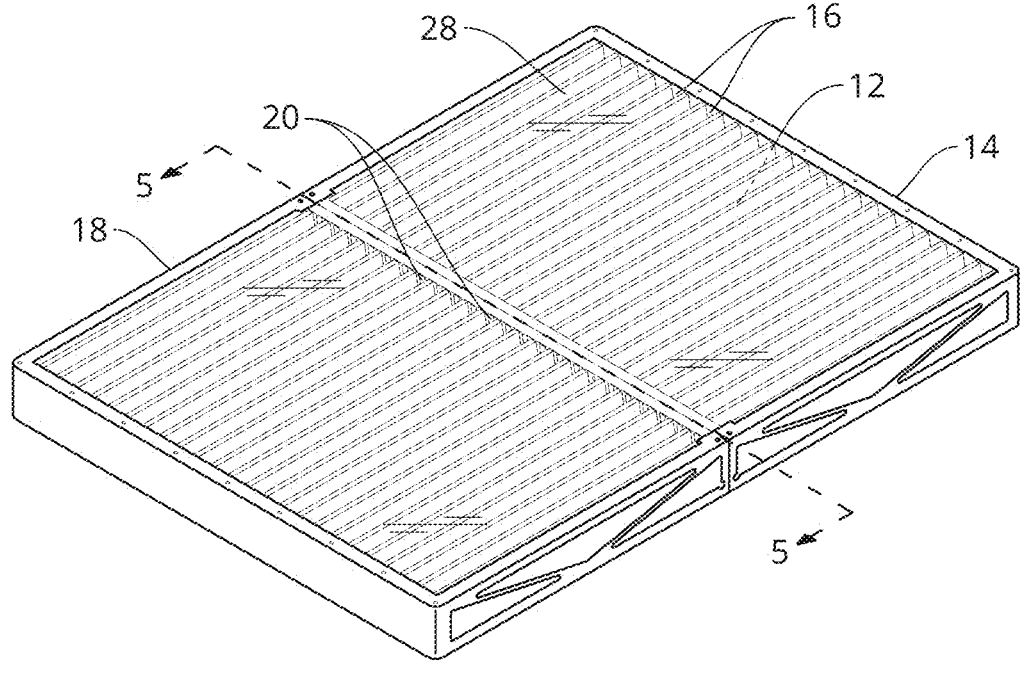
FIG. 4 is a perspective view of an exemplary embodiment of the subject disclosure.
Figure 5:
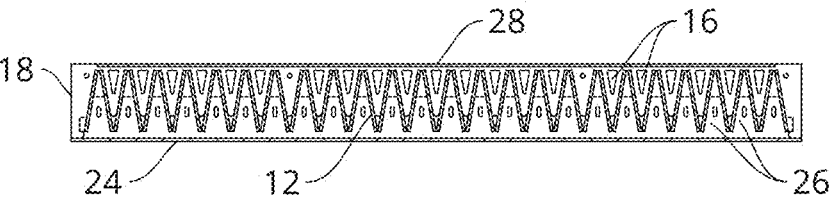
FIG. 5 is a section view of an exemplary embodiment of the subject disclosure, taken along lines 5-5 in FIG. 4. The mounting bracket 26 may include a series of flanges that alternate in angular orientation so as to support pairs of solar modules 12 in a zig-zig orientation, whereby the two solar modules 12 of the solar module pair define an included angle of approximately twenty degrees.
Figure 6:
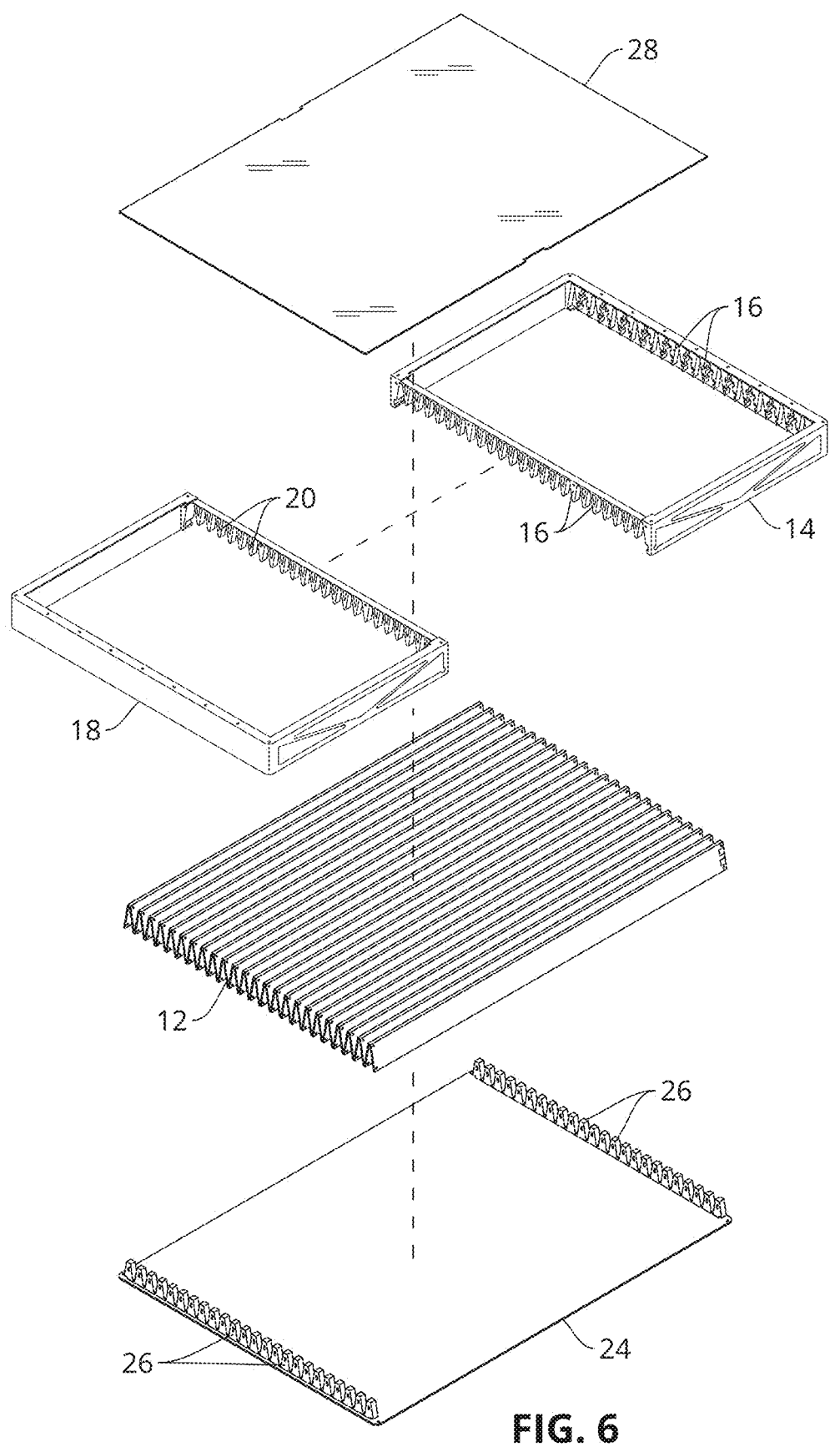
FIG. 6 is an exploded perspective view of an exemplary embodiment of the subject disclosure, illustrating the operative association of the panel securing teeth 16 and 20 of the first housing frame 14 and the second housing frame 18, respectively. It should be noted that reference numeral 24 indicates the rear panel but also defines the footprint-plane for the assembly 10; specifically, the linear area defined by rear panel 24 (which may extend along an 'x-axis' in the direction of the 'X distance' shown in FIG. 10) extends along the footprint-plane and defines its metes and bounds).

The rigid frame (usually aluminum) for structural support and installation may be composed of two removably attachable portions: a first housing frame 14 and a second housing frame 18 that can operatively associate, as shown in FIG. 6.

Each solar module 12 has a sunlight absorbing (active) photovoltaic side positioned to face outward in the direction of a light source. This photovoltaic side is covered by a clear front panel 28 that operatively associates with the housing frame. The protective front panel 28 is typically formed of an optically transparent composition comprising additives to protect the underlying solar cells from external elements including but not limited to dust, sand, and precipitation.

Figure 10:
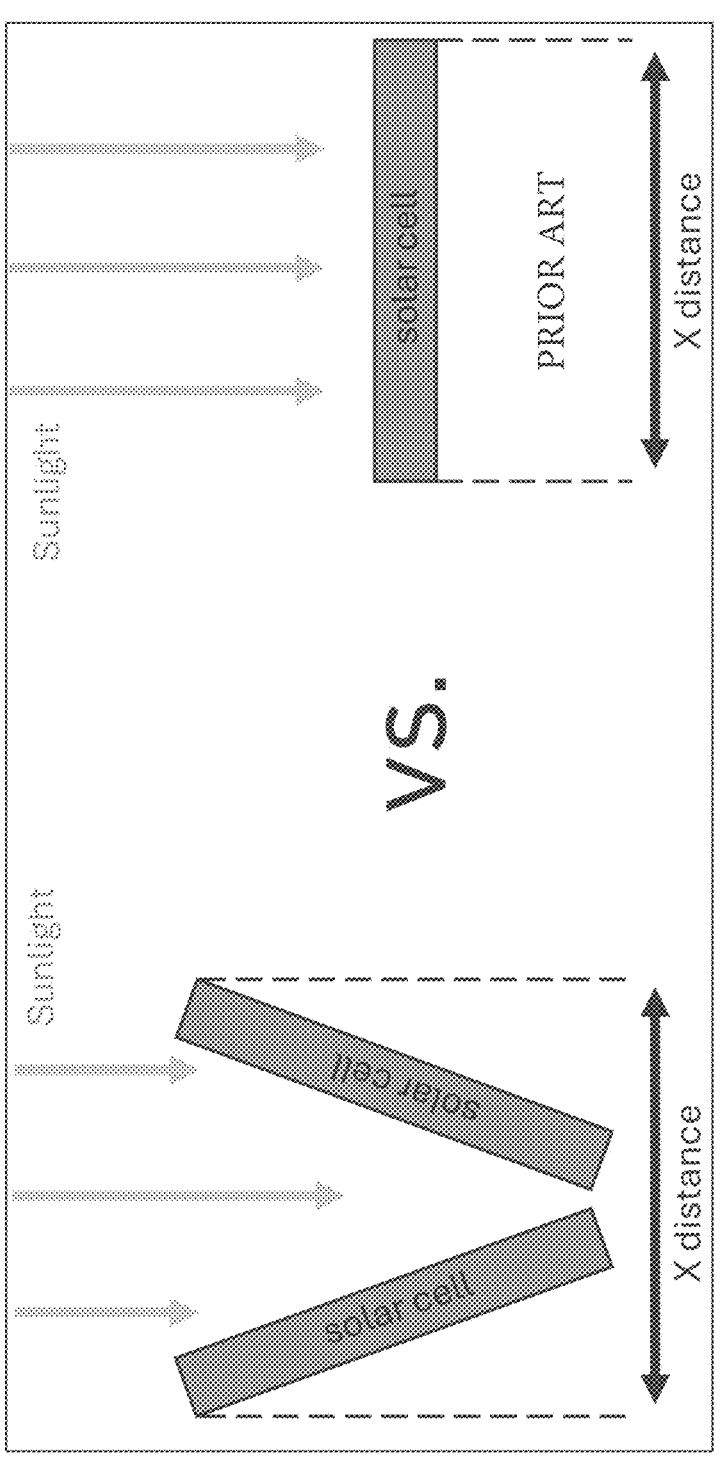
FIG. 10 is a schematic view of an exemplary embodiment of the subject disclosure, illustrating the zigzag orientation, where two adjacent solar modules define an approximate twenty-degree included angle, in comparison to a flat solar module of the prior art.
Figure 11:
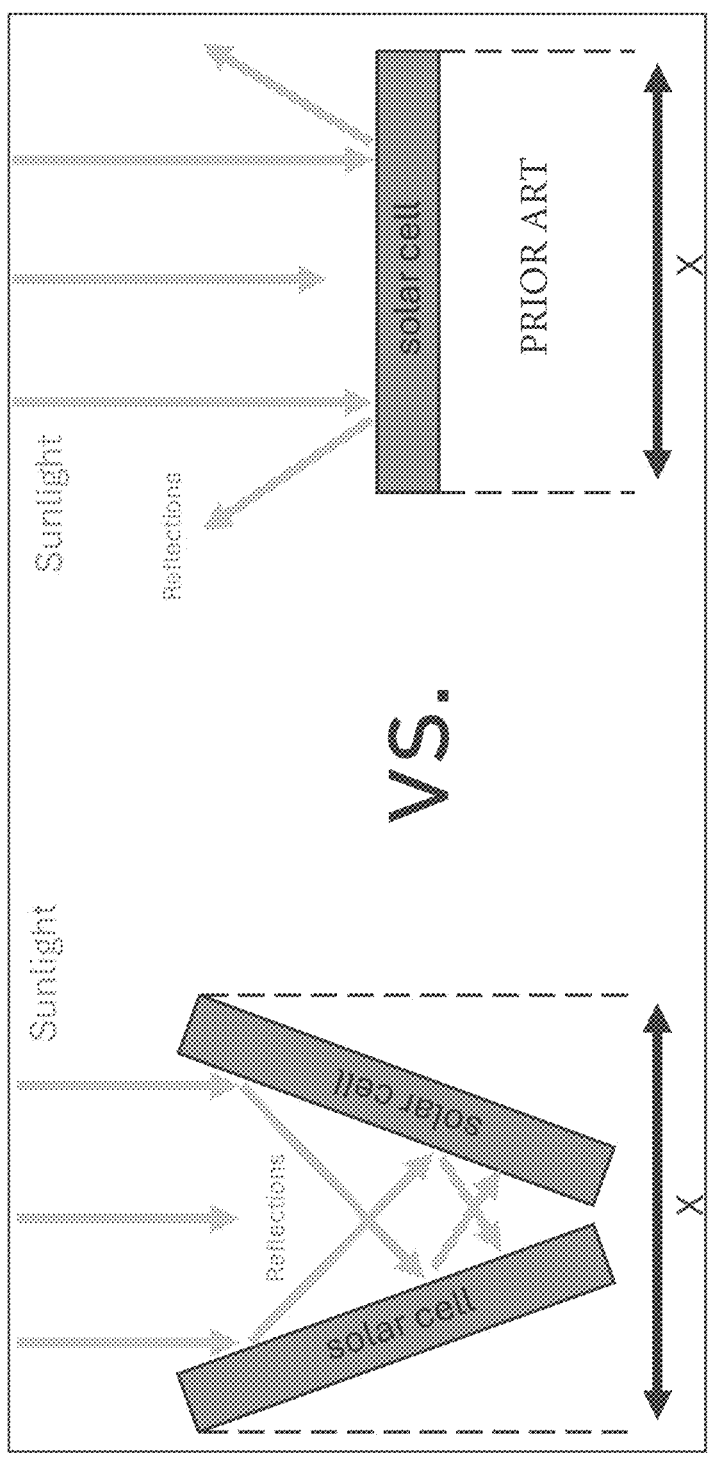
FIG. 11 is a schematic view of an exemplary embodiment of the subject disclosure, illustrating the direction of the light source being normal to the x-axis (that extends in the direction of the rear panel, not shown here) and how reflective light is conserved by way of the zigzag orientation in comparison to the flat solar module of the prior art.
Figure 12:
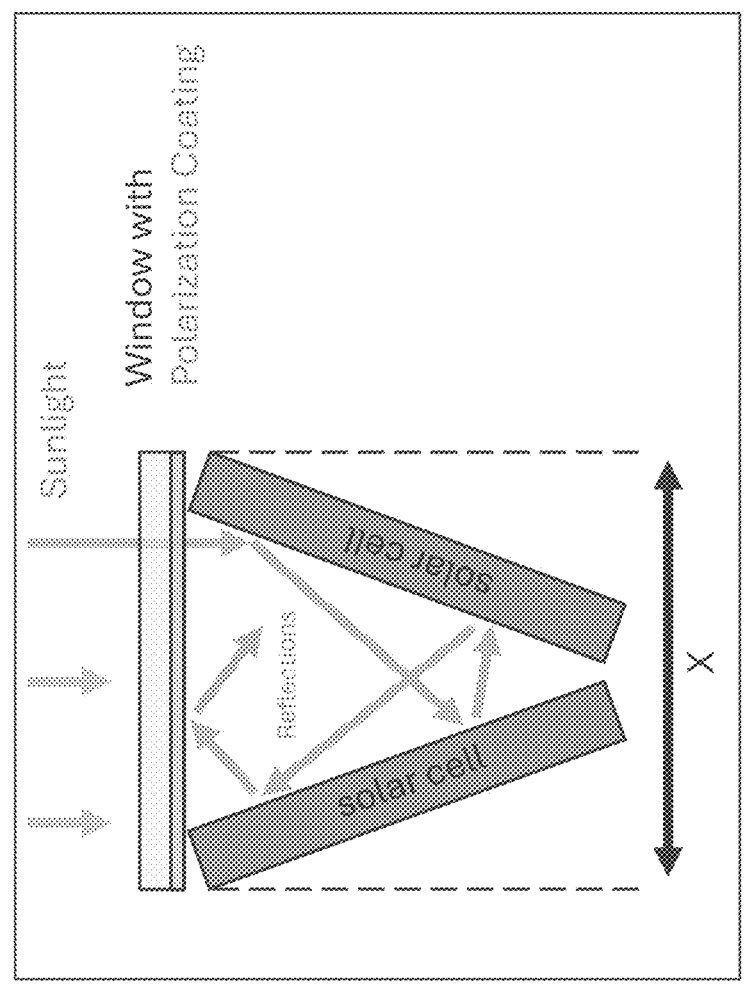
FIG. 12 is a schematic view of an exemplary embodiment of the subject disclosure, illustrating how the front panel 28 can be equipped with a window polarization coating on its interior surface to improve the collection of reflected sunlight, thereby increasing power efficiency.
Figure 16:
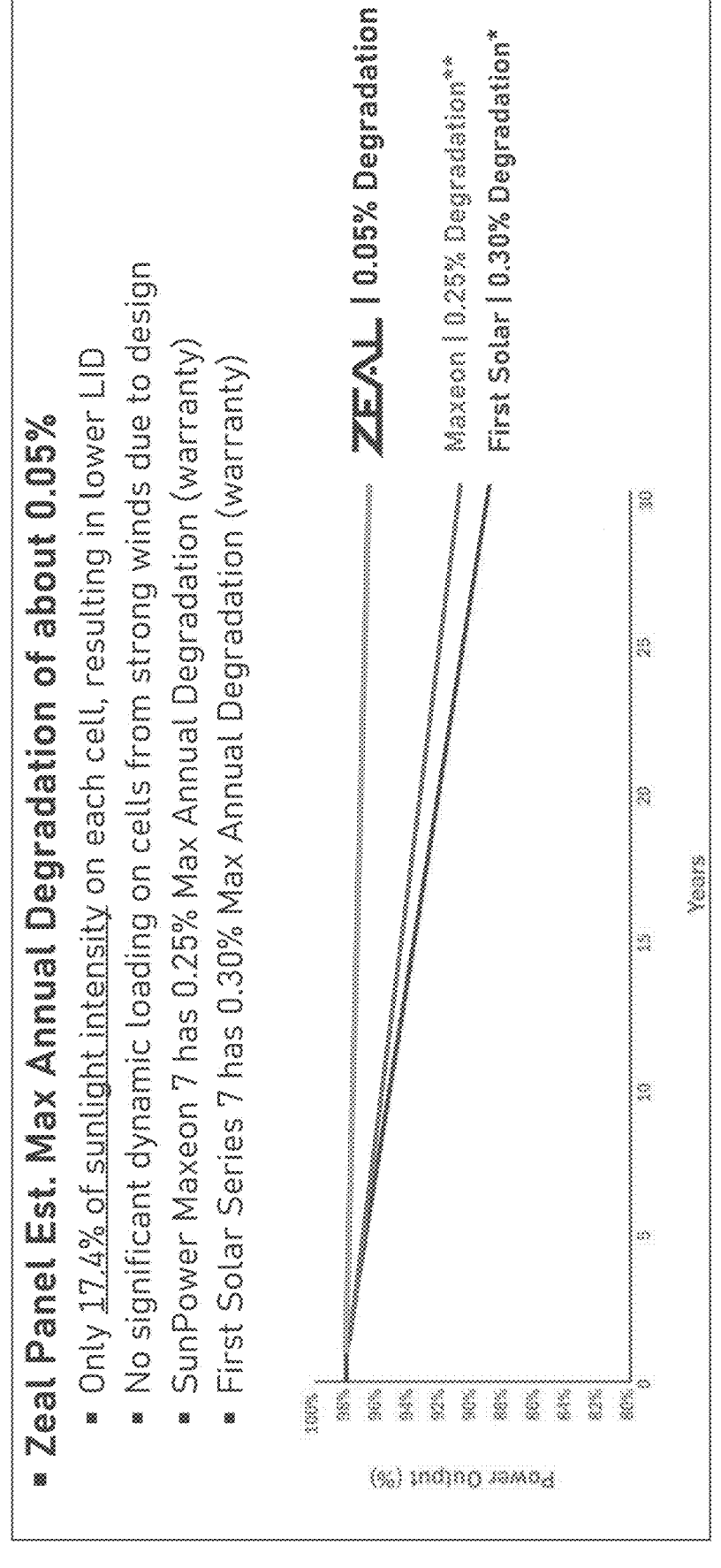
FIG. 16 is a diagrammatical view of an exemplary embodiment of the subject disclosure, showing theoretical data comparing degradation of the subject disclosure (identified as 'ZEAL') in comparison to prior art products. Degradation is lower with the subject disclosure because of the zigzag orientation since one of the key variables affecting solar cell degradation is UV radiation exposure (or light intensity), which causes polymer/cell material degradation. Specifically, the angled orientation of the modules, relative to the direction of the light source, limits UV radiation and sunlight intensity relative to the horizontally oriented prior art solar cells and modules.
Figure 17:
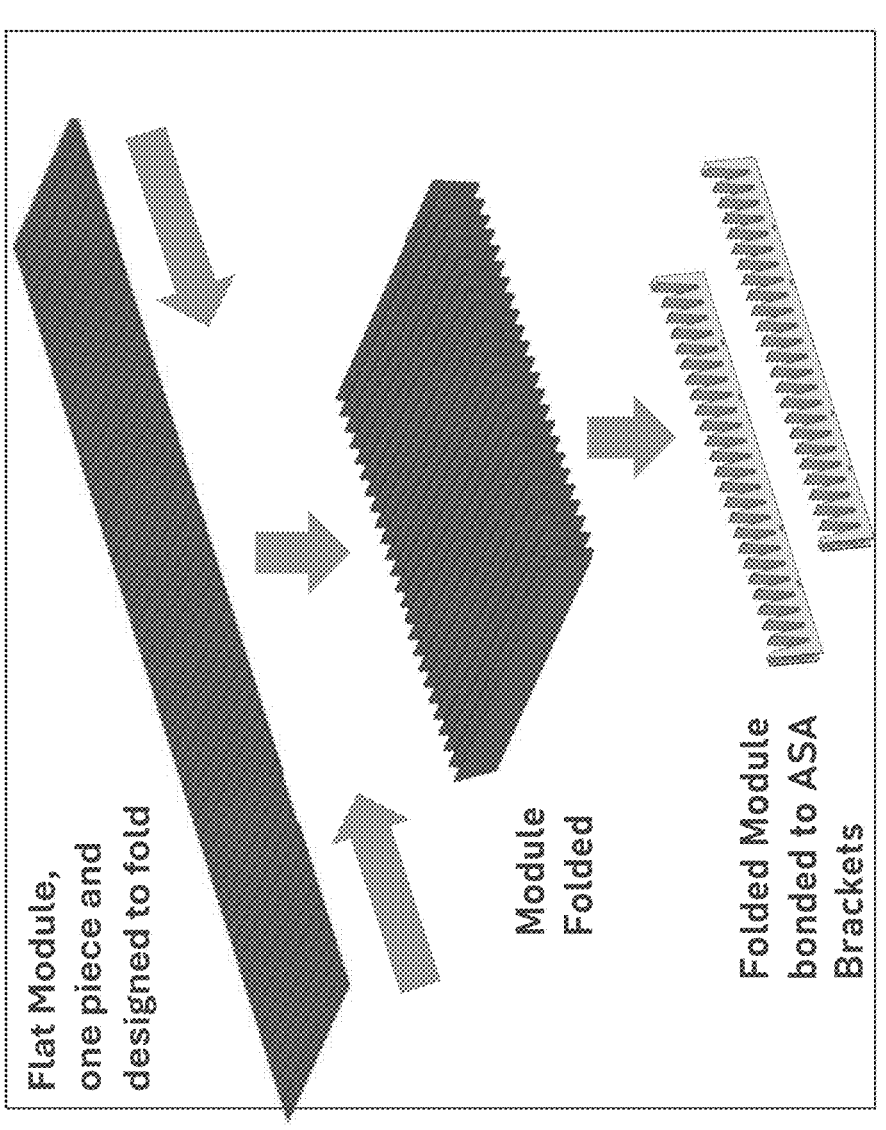
FIG. 17 shows a plurality of views of an exemplary embodiment of the subject disclosure, illustrating the ease of manufacturing the final product of an array of solar module pairs.
Figure 18:
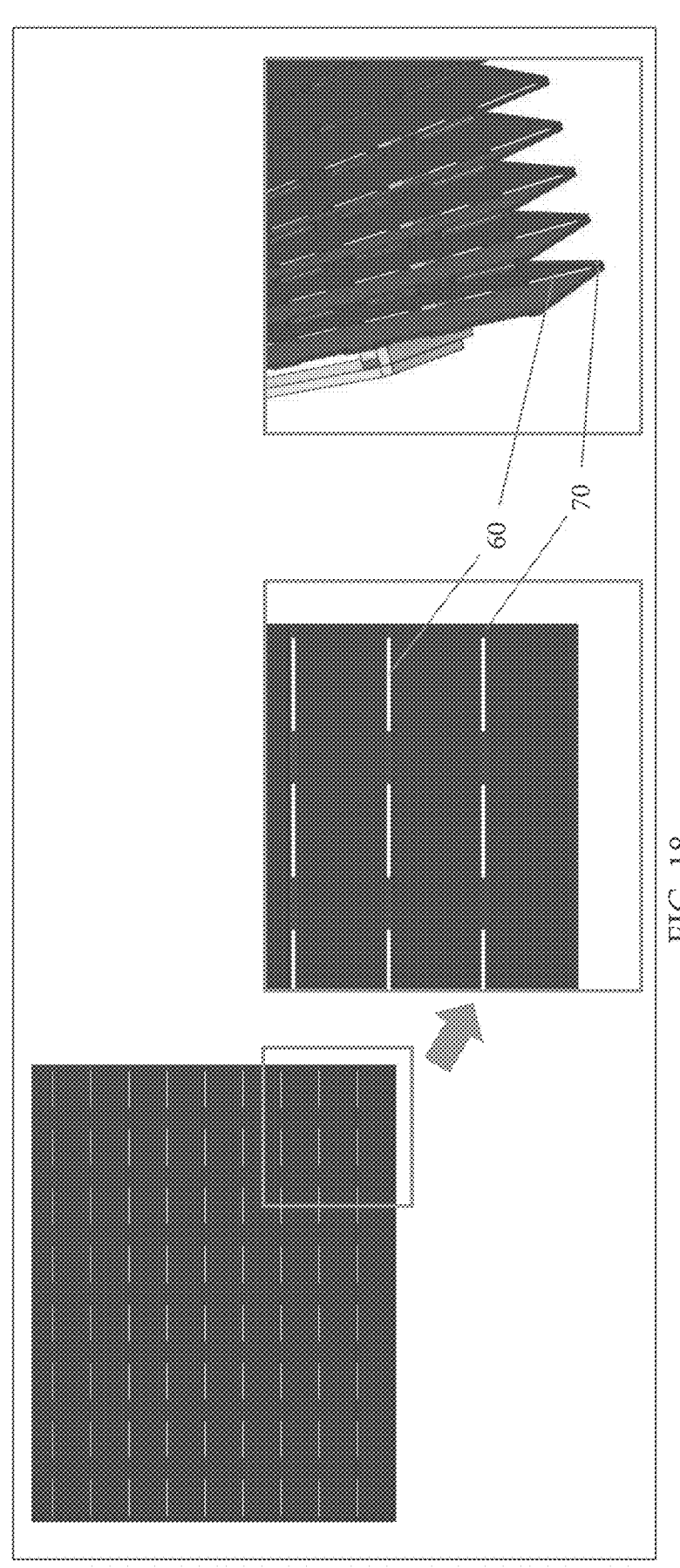
FIG. 18 shows a plurality of views of an exemplary embodiment of the subject disclosure, illustrating how the design reduces soiling through drainage slots 60 along an intermediate portion 70 that separates two solar modules 12 of a pair, whereby the drainage slots 60 allow drainage of rain, dust, debris as well as improve the bending of the intermediate portion 70.
Figure 19:
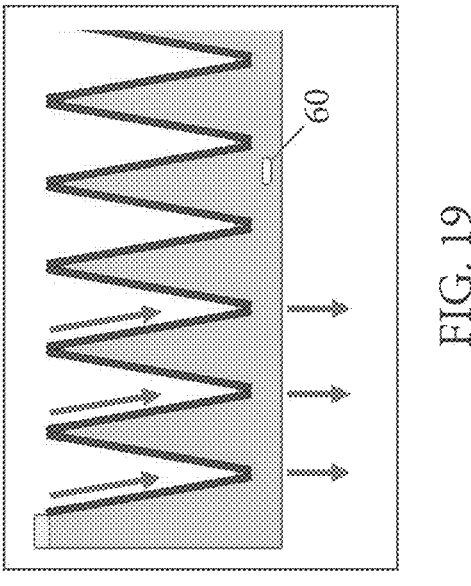
FIG. 19 is a section view of an exemplary embodiment of the subject disclosure, illustrating the steep slope of the included angle reduces debris and precipitation collection (compared to the flat modules of the prior art), where the debris and precipitation pass through the drainage slots 60.
Figure 20:
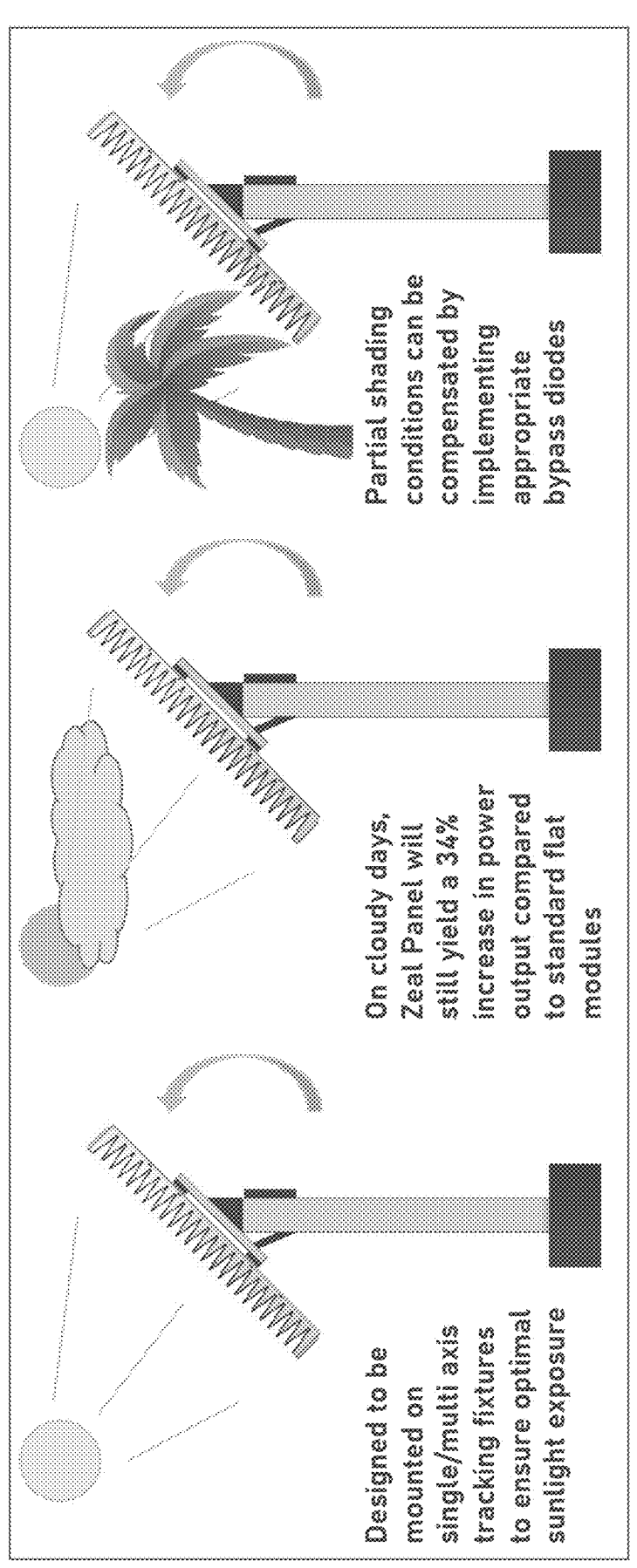
FIG. 20 shows various views of an exemplary embodiment of the subject disclosure, illustrating the solar tracking fixture base 30 handling low-light conditions.
Figure 21:
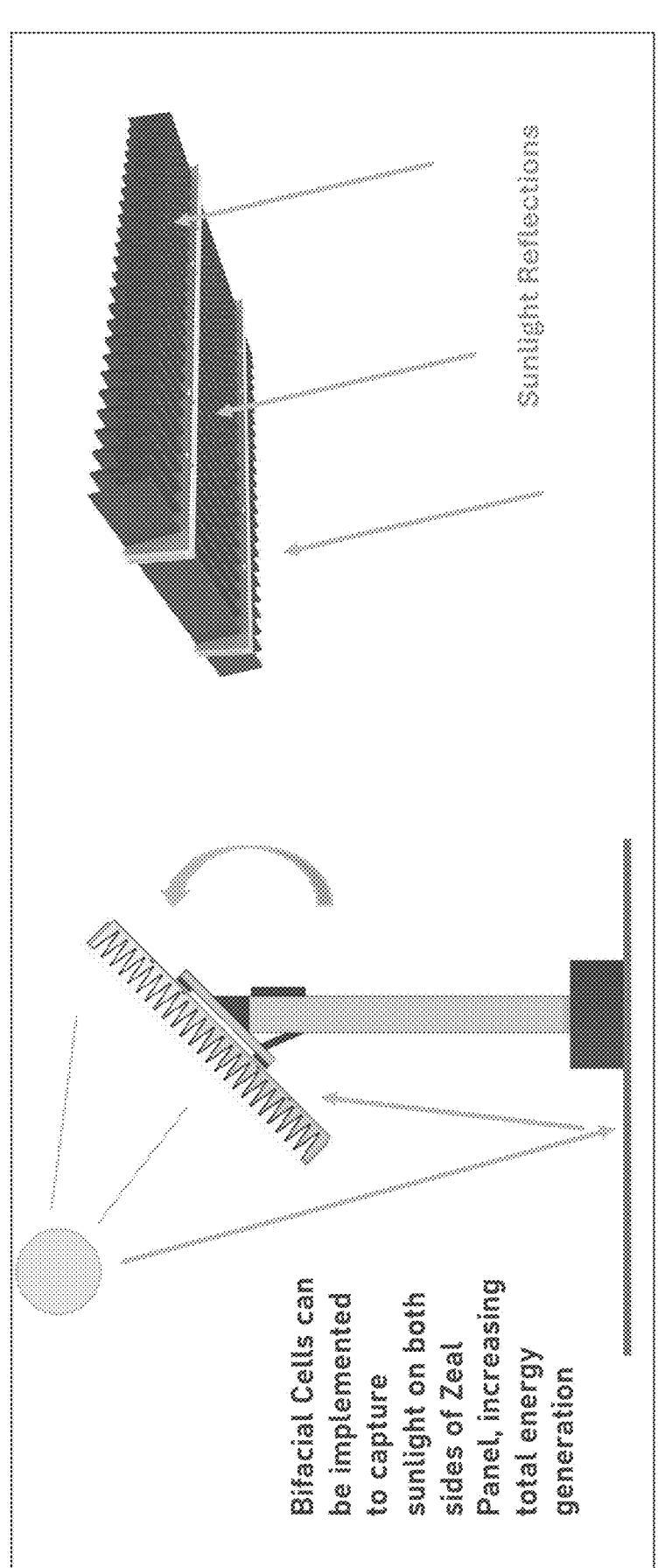
FIG. 21 shows various views of an exemplary embodiment of the subject disclosure, illustrating the solar tracking fixture base 30 enable bifacial solar modules/cell utilization.

Referring to FIGS. 10 and 11, the term "zigzag orientation" refers to two adjacent solar modules 12 (or solar module pairs) that define an included angle of approximately twenty degrees, whereby each solar module or the solar module pair defines an approximate eighty degree angles relative to the front or rear panels 24 and 28. This zigzag orientation enables significantly more solar cell surface area that is exposed to the sun. Even with less sunlight intensity, this delivers greater exposure as reflected light that scatters off the photovoltaic side of a first module 12 of a module pair may be reflected onto the photovoltaic side of the adjacent (or second) module 12 of the module pair, thereby harnessing more light that would otherwise be lost. In addition, a lower sunlight intensity on each solar module will reduce temperature increase in the solar module and improve performance compared to prior art.

A solar tracking fixture 30 that holds and moves the housing frame to an orientation with optimal sunlight, where sunlight is perpendicular to the photovoltaic side or clear front panel 28, can be mounted to the ground, vehicle, or other structure. Each housing frame may be integrated with solar tracking sensor technology, a solar tracking computer and connected actuators (not shown) to facilitate this functionality. One solar tracking fixture 30 can hold multiple housing frames, if necessary.

The clear front panel 28 allows sunlight to pass through onto the solar cells of the solar modules 12, protecting the enclosed solar modules 12 against surrounding environment. The clear front panel 28 can have a surface texture to improve transmissibility and/or absorption of sunlight. Fasteners/adhesives may be used to secure the clear front panel 28 to the housing frame to enclose and protect solar module 12. In some embodiments, the clear front panel 28 can be embedded or integrated into the solar modules 12.

Environmental sealing of the housing frame with O-ring or other methods are contemplated by the subject disclosure, as are adhesives, paints, films, coatings, wiring, and fasteners to improve the performance of the subject disclosure, as long as the housing frame holds, encloses and protects the solar modules 12 against the surrounding environment. Critically, the housing frame 14 holds solar cells/modules in zigzag orientation.

The solar modules 12 are mounted within the housing frame in a zigzag and/or wave-like orientation and secured in place. The solar modules 12 are then connected to wiring within the housing frame. The wiring connects all the solar modules 12 to the power output port/connectors/junction box 22 that are fixed in place in the housing 14, 18. The window 28 is then placed on top of the housing 14, 18 with an O-ring or sealant to enclose the solar modules 12. The window 28 is either secured to the housing frame with fasteners/adhesive, and/or embedded onto the solar cells. The housing frame is mounted to a solar tracking fixture 30 with fasteners/adhesive.

Power output port/connectors/junction box 22 that are wired to connected solar modules 12 within housing frame, allowing power output from the solar modules 12 to be transferred outside of housing frame. Location can vary depending on housing frame.

Once the assembly is complete, the subject disclosure can be mounted at a location where it can receive direct sunlight, such as the solar tracking fixture 30. The solar tracking fixture 30 is adapted to use built-in sensors and actuators to mechanically orient the housing to a position with optimal sunlight. The enclosed zigzag orientation of solar modules 12 will then produce a high-efficiency power output using the optimal sunlight. If necessary, multiple housings can be electrically connected in an array and mounted on a single solar tracking fixture. The subject disclosure will then be electrically connected to an energy utility grid or a suitable energy storage device to deposit the generated power.

A method of making the subject disclosure may include the following. A manufacturer may mount solar modules 12 within the housing frame in a zigzag orientation and secure in place. Then the manufacturer can connect the solar modules 12 using wiring within the housing frame via the power output port/connectors 22 that may be fixed in place in the housing frame. Then place the clear front panel 28 on top of the housing frame with an O-ring or sealant to enclose the solar modules 12. The manufacturer may secure the clear front panel 28 to the housing frame with fasteners/adhesive. Finally, the manufacturer or downstream user may mount the housing frame onto a solar tracking fixture 30 with fasteners/adhesive. If necessary, multiple housings frames can be electrically connected and mounted on the solar tracking fixture 30.

Figures 7, 8, 9:
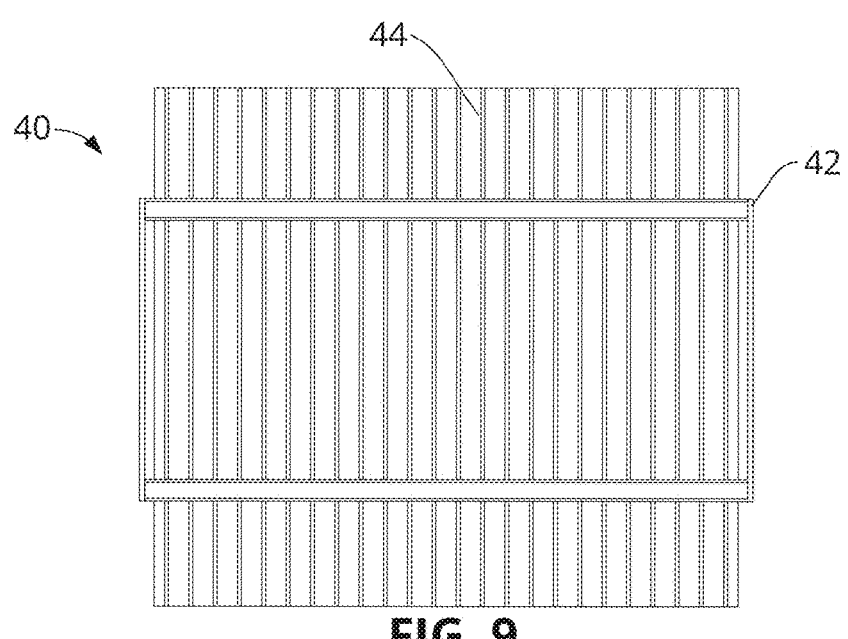
FIG. 7 is a perspective view of an exemplary embodiment of the subject disclosure shown in a used condition operatively associated with a solar tracking fixture base 30.
FIG. 8 is a side elevation view of an exemplary embodiment of the subject disclosure shown in the used condition operatively associated with the solar tracking fixture base 30.
FIG. 9 is a bottom plan view of an exemplary embodiment of the subject disclosure, illustrating the solar modules 44 mounted on brackets 42 (instead of mounted within a housing).

Referring to FIGS. 7 through 9, the subject disclosure includes alternate configurations, where the solar tracking fixture 30 is optional. Another configuration of the subject disclosure is where the subject disclosure is embedded onto solar modules 44. Another configuration of this invention is possible, where the clear front panel 28 is removed completely. Another configuration of the subject disclosure is where the solar modules 12 are replaced with additively manufactured solar modules 44. Another configuration of the subject disclosure is where the solar panel assembly 40 are replaced with a flexible solar cell/module bent in a zigzag or wave-like shape. Another configuration of the subject disclosure is where a cooling system is integrated into the housing frame using either air cooling, liquid cooling, or thermoelectric cooling. Another configuration of subject disclosure is where a heatsink is integrated into the housing frame. Another configuration of the subject disclosure is where an energy storage device is built into the housing frame 42 that stores the solar generated energy produced by the solar panel assembly 40. Another configuration of the subject disclosure is where the solar tracking fixture 30 is integrated into the housing frame. In another configuration, the solar tracking fixture 30 holds and moves the housing to an orientation close to optimal sunlight exposure for the solar cells/modules.

To use the subject disclosure, a user simply mounts the subject disclosure at a location where it can receive direct sunlight. Next, the solar tracking fixture needs to be set up and/or calibrated. Finally, the subject disclosure needs to be electrically connected to a suitable energy utility grid or suitable energy storage device. Once complete, the subject disclosure will begin generating power. The power output will be significantly greater than traditional solar panels. In addition, the higher power output, lower costs, smaller land area needed, and zero emissions will make solar power more desirable than other energy sources.

Additionally, the subject disclosure can also be used for residential solar power generation, where it can be mounted on or near residential homes to provide power. This subject disclosure can also be used for commercial solar power generation, where it can be mounted on or near commercial buildings to provide power. Likewise, the subject disclosure can also be used for industrial solar power generation, where it can be mounted on or near industrial buildings or facilities to provide power. The subject disclosure can also be integrated into electric vehicle charging stations, where the power produced from the subject disclosure can be used to charge hybrid or electric vehicles. The subject disclosure can also be integrated into the design of a hybrid or electric vehicle (motor vehicle, automobile, aircraft, watercraft, spacecraft, etc.), where it can generate power for the vehicle while it is operating or while it is stationary. The subject disclosure can also be integrated into the design of consumer products, where it can generate power for the product.

In addition to producing power, the subject disclosure can also create large areas of shade, and can also be used as a rigid, structural component/material.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the subject disclosure and that modifications may be made without departing from the spirit and scope of the subject disclosure as set forth in the following claims.

What is claimed is:

1. A solar panel assembly comprising: one or more solar module pairs that define a zigzag orientation, wherein for each solar module pair, two adjacent solar modules face each other to define an included angle of approximately twenty degrees.

2. The solar panel assembly of claim 1, wherein, for each of the two adjacent solar modules, the solar module defines an angle of approximately ten degrees relative to a direction of a source of light in a used condition.

3. The solar panel assembly of claim 2, wherein a footprint of the solar panel assembly defines a footprint-plane, and wherein the footprint-plane is normal to the direction of the source of light in the used condition.

4. The solar panel assembly of claim 3, further comprising a solar tracking fixture operatively associated with the solar panel assembly, wherein the solar tracking fixture is configured to maintain the footprint-plane normal to the direction of the source of light in the used condition.

5. The solar panel assembly of claim 2, furthering comprising a frame that houses the one or more solar module pairs.

6. The solar panel assembly of claim 5, wherein the frame provides a plurality of sidewalls; each sidewall of two opposing sidewalls of the plurality of sidewalls comprises a mounting bracket, wherein the mounting bracket defines a series of zigzag oriented flanges, where each two adjacent zigzag oriented flanges define an included angle of approximately twenty degrees.

7. The solar panel assembly of claim 5, wherein the frame comprises a first housing frame and a second housing frame, both housing frames configured to form a removable connection.

8. The solar panel assembly of claim 7, wherein each housing frame provides a plurality of sidewalls; each sidewall of two opposing sidewalls of the plurality of sidewalls comprises a mounting bracket, wherein the mounting bracket defines a series of zigzag oriented flanges, where each two adjacent zigzag oriented flanges define an included angle of approximately twenty degrees.

9. The solar panel assembly of claim 8, wherein each mounting bracket of first housing frame is dimensioned and shaped to form a removably connection with each mounting backet of the second housing frame, whereby the removably connection is formed.

10. The solar panel assembly of claim 1, wherein each solar module of the one or more solar module pairs comprises a photovoltaic side, wherein each solar module pair comprises two photovoltaic sides facing each other and defining the included angle.

11. The solar panel assembly of claim 10, wherein each solar module pair is interconnected by an intermediate portion sufficiently flexible to the solar panel assembly from a flat condition to a folded condition providing the one or more solar module pairs zigzag oriented.

12. The solar panel assembly of claim 11, further comprising at least one drainage slot in each intermediate portion.

13. The solar panel assembly of claim 12, wherein each solar module pair comprises two elongated solar modules wherein a length of each solar module is at least ten times that of a width of the solar module.

* * * * *